United States Patent [19]

Cabus et al.

[11] Patent Number: 4,534,118
[45] Date of Patent: Aug. 13, 1985

[54] SOLAR-ASSISTED MOBILE FOOD DEHYDRATOR

[75] Inventors: Marcello M. Cabus, Hotchkiss; Billy D. Howard, Delta; James W. Colt; Edward S. Tuft, both of Hotchkiss, all of Colo.

[73] Assignee: Sun-Flo International, Inc., Hotchkiss, Colo.

[21] Appl. No.: 412,932

[22] Filed: Aug. 30, 1982

[51] Int. Cl.³ .............................. F26B 21/08
[52] U.S. Cl. ............................ 34/34; 34/35; 34/47; 34/50; 34/86
[58] Field of Search ............. 34/35, 86, 204, 50, 34/93, 68, 54, 48, 236, 34, 47; 165/DIG. 8, 166; 414/679

[56] References Cited

U.S. PATENT DOCUMENTS

| | | |
|---|---|---|
| 237,003 | 1/1881 | Emery . |
| 2,294,530 | 9/1942 | Wiese ............................ 34/196 |
| 2,397,393 | 3/1946 | McLeod . |
| 3,943,842 | 3/1976 | Bills . |
| 4,021,929 | 5/1977 | Black ............................ 34/86 |
| 4,051,969 | 10/1977 | Homanick ..................... 414/679 |
| 4,054,980 | 10/1977 | Roma ........................ 165/DIG. 8 |
| 4,099,338 | 7/1978 | Mullin et al. ................... 34/86 |
| 4,100,682 | 7/1978 | Corrigan . |
| 4,114,288 | 9/1978 | Fowler . |
| 4,152,842 | 5/1979 | Laughlin . |
| 4,192,081 | 3/1980 | Erickson . |
| 4,221,059 | 9/1980 | Everitt . |
| 4,240,581 | 12/1980 | Fowler ............................ 34/54 |
| 4,263,721 | 4/1981 | Danford . |
| 4,270,282 | 6/1981 | Lotz ............................. 34/86 |
| 4,304,221 | 12/1981 | Trihey ........................... 126/425 |
| 4,317,290 | 3/1982 | Voswinckel ..................... 34/86 |

FOREIGN PATENT DOCUMENTS 823519 1/1938 France ............................ 414/679

Primary Examiner—Larry I. Schwartz
Attorney, Agent, or Firm—Banner, Birch, McKie & Beckett

[57] ABSTRACT

The cost of preserving and transporting food is minimized, to the end that food may be made more widely available. A trailer, movable by a small vehicle, houses a completely self-contained food dehydration plant which can be towed to the field in order to preserve the food as soon as it is harvested. The plant dehydrates by blowing a stream of hot air over the food. In order to conserve energy, the air is preheated both in a solar collector (by sunlight) and in a heat exchanger (by exhaust air). Some air used for dehydration is not exhausted but instead is recirculated through the plant, further contributing to efficiency.

34 Claims, 15 Drawing Figures

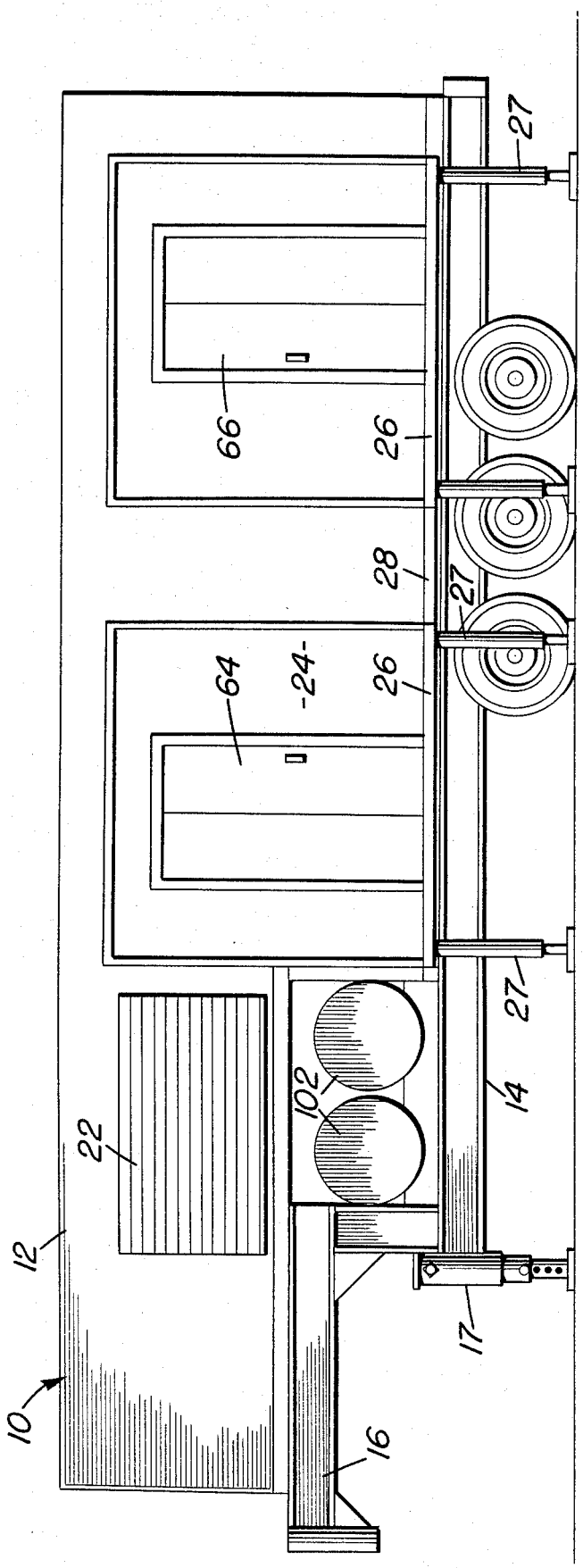
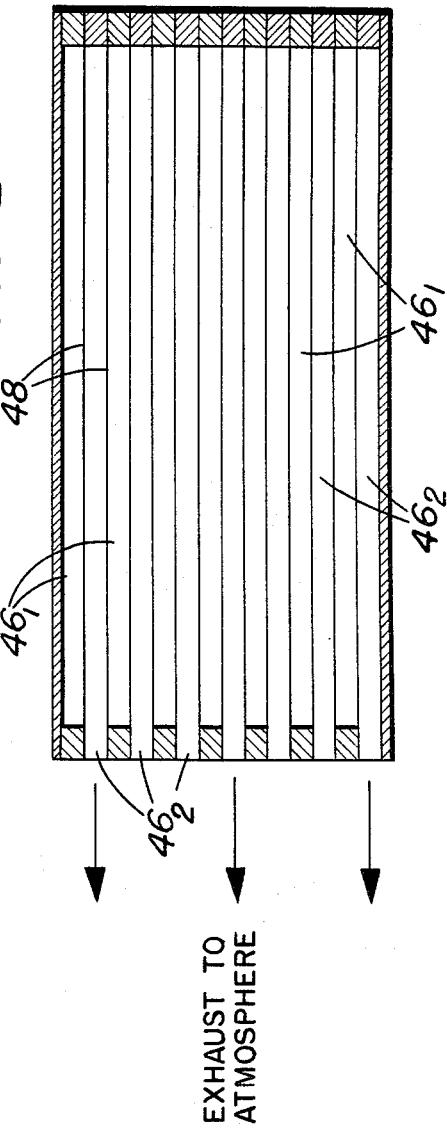
FIG. 2
FIG. 10C
EXHAUST TO ATMOSPHERE

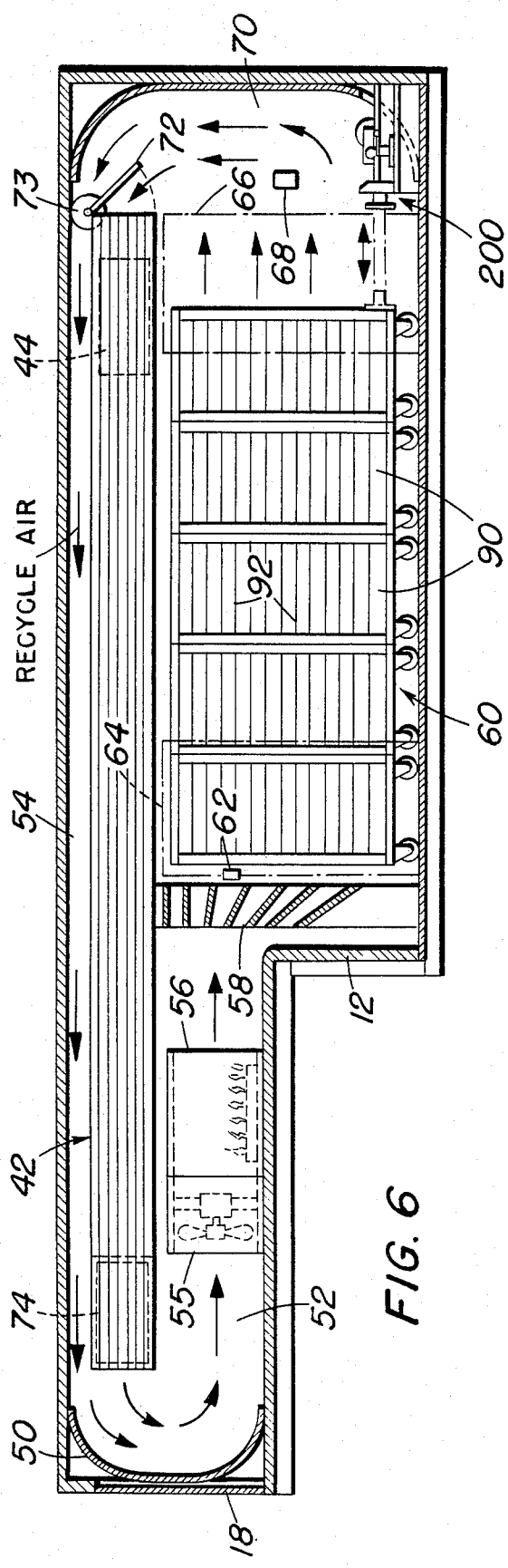
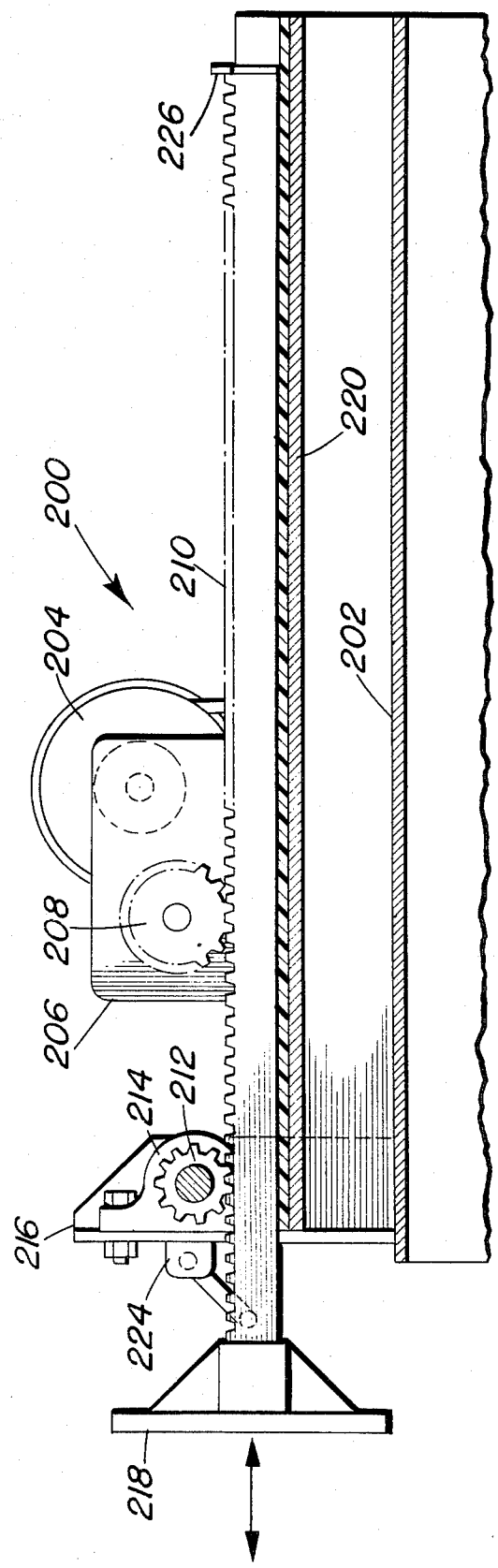

SOLAR-ASSISTED MOBILE FOOD DEHYDRATOR

BACKGROUND OF THE INVENTION

This invention is concerned with the efficient preservation and transportation of food in order to reduce the cost of food and make it more widely available.

Most food consumed today must be preserved in one way or another during its journey from the place where it is grown to the consumer's table. The methods of preservation in greatest demand, freezing and canning, are also the most expensive; consequently, an appropriate point at which to begin reducing the cost of food is by using the most inexpensive method of preservation which will at the same time meet the desired standards for shelf life, appeal to consumers, and other factors.

Furthermore, it is well known that during the processes of harvesting, transporting, storing, selling, and even consuming food, much of it is wasted, for a variety of reasons. If some or all of this wasted food could be "reclaimed" and added to the food supply, the cost of food could be diminished even further.

SUMMARY OF THE INVENTION

It is a general object of this invention, as noted above, to reduce the cost of food, making it more widely available, by reducing the expense of preserving and transporting food. It is a further object to accomplish this while at the same time maintaining the nutritional value of the food preserved.

It is a specific object of the present invention to provide a food preservation apparatus which can be transported to the location where the food is harvested and which can be operated there without the need for any external connections, such as power, or any additional equipment. In other words, it is an object of this invention to provide a mobile, self-contained food preservation apparatus.

Another object of the invention is to use a combination of energy-saving methods in order to further reduce the expense of food preservation.

The specific mechanism chosen to fulfill the invention's objectives, noted above, is a solar-assisted mobile food dehydrator. The expense of food preservation is kept to a minimum by using an age-old and extremely economical method—dehydration. Dehydration also reduces transportation costs: a given quanity of food (measured in nutritional terms) weighs less and therefore costs less to ship when water, the nonessential ingredient, is removed. Because the dehydrator of this invention is self-contained and mobile, it can be brought to the fields where the food is grown, taking immediate advantage of transportation economies. The cost of preserving the food is reduced even further by making the dehydrator as efficient as possible, through the use of solar energy and the recycling of heat energy.

Essentially, food is dehydrated in the mobile food dehydrator of this invention by chopping it into small pieces and exposing them to a current of hot, dry air. Before drying, various foods must be prepared in various ways. For example, most vegetables should be blanched; corn must be husked; and apples are generally peeled and cored. A mobile semi-trailer carries all equipment necessary to pre-process and package the food, making it a truly self-contained unit.

After the food has been pre-processed, chopped food ready for dehydration is transported via an articulating conveyor and loaded onto trays which are then inserted into wheeled carts, thirty-one trays to a cart. Seven carts, each weighing two hundred pounds when fully loaded, can be placed in the dehydrating tunnel inside the trailer; they are pushed into place by an electric ram. Dehydration is accomplished by blowing a stream of hot air through the tunnel for the period of time (usually about four hours) necessary to remove the desired amount of water from the food.

The invention conserves energy in several ways. First, incoming air is preheated in a solar collector, which creates heat from sunlight. Next, the air travels through a heat exchanger, which reclaims a portion of the energy remaining in the air which is about to be exhausted from the device. Depending upon the humidity within the drying tunnel, more or less air is exhausted—that which is not is returned to the tunnel, or recirculated, to pick up even more moisture, and recirculation also contributes to the efficiency of the dehydrator. Additional energy savings are possible by recapturing heat created during the generation of electricity, which is provided by a generator powered by an internal combustion engine. Incoming air can absorb heat from these two machines if it is merely blown past them; or the exhaust gases of the internal combustion engine or the coolant of the water-cooled generator may be used to preheat the air.

This invention is also capable of maintaining the nutritional value of the food it preserves. By controlling the temperature of the food during the dehydration process, enzymes, which would otherwise be destroyed, will remain in the food.

In an eight-hour period, the solar-assisted, mobile food dehydrator can process two thousand pounds of moist food, delivering eight hundred fifty pounds of the finished product. Only lettuce, avocados, and citrus fruits are unsuitable for dehydration in this apparatus.

BRIEF DESCRIPTION OF THE DRAWINGS

FIG. 2 is a left side elevational view of the trailer;

FIG. 6 is a vertical, longitudinal sectional view of the drying tunnel, taken along line 6—6 of FIG. 5;

FIG. 8 is a sectional view taken along the line 8—8 of FIG. 7;

DETAILED DESCRIPTION OF THE PREFERRED EMBODIMENT

Figure 1:
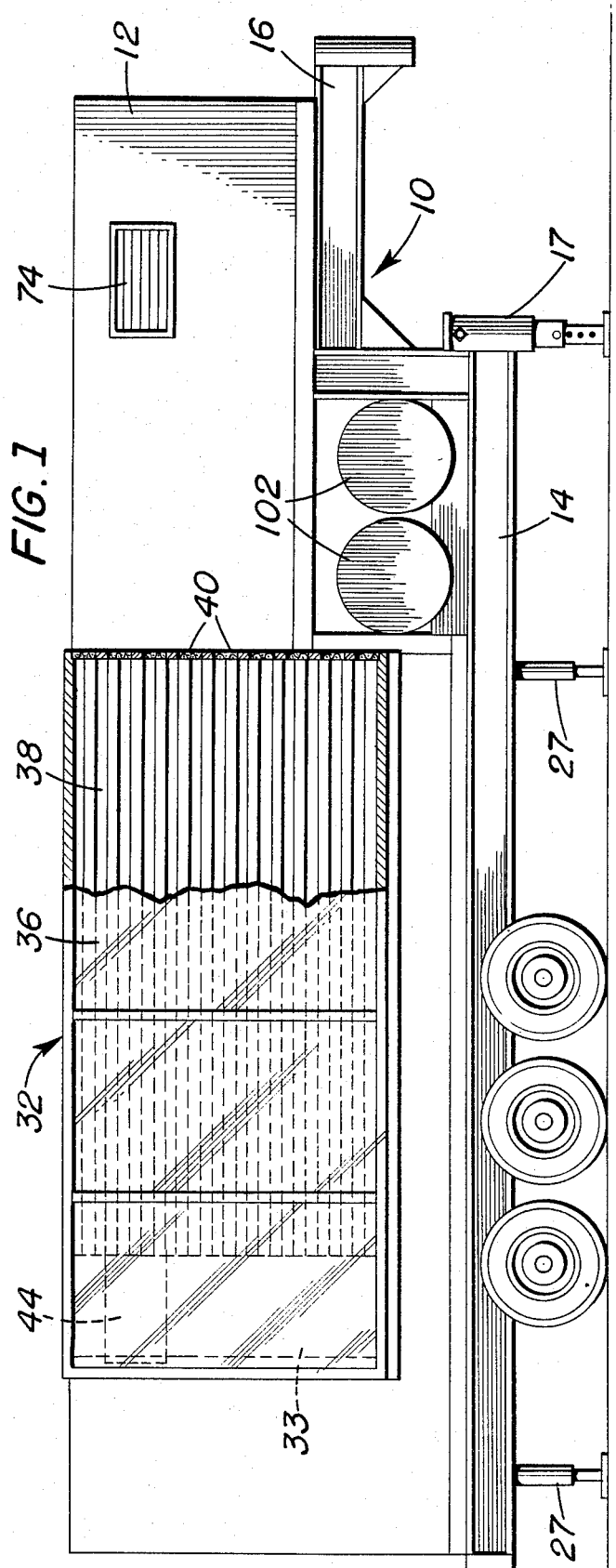
FIG. 1 is a right side elevational view of the trailer of the present invention.

FIGS. 1-4 show in elevational view the preferred embodiment of the invention: a self-contained, mobile food dehydration plant housed in a 32-foot semi-trailer 10 capable of being towed to the job site. The trailer body 12 is of conventional Aluminum frame construction and is erected on a three-axled chassis 14 with a towing attachment 16 enabling the dehydrator to be moved by a pickup truck with a "gooseneck" trailer hitch. The chassis is supported parallel to the ground when parked by a pair of adjustable jacks 17 attached under the "gooseneck" portion at the forward end of the chassis.

At the front, or gooseneck, end of the trailer 10 is an access panel 18, leading to the heater/blower compartment 52, and another access panel 20, leading to the generator compartment 96. Access panel 22 on the left side of the trailer provides entry to a storage area in the generator compartment 96.

The left half of the rear part of the trailer (indicated generally at 24) serves as an equipment storage area during transit to a job site and as a work area while the dehydrator is operating. Access to this storage/work area 24 is provided through two large, fold-down doors 26 which double as work platforms during food processing. A center board 28, stored in area 24 when not in use, joins the two doors 26 to form a large, continuous platform which is supported parallel to the ground by adjustable legs 27. Another access door 30 opens from work area 24 to the rear of the trailer.

SOLAR COLLECTOR

The right side of the trailer is illustrated in FIG. 1, which shows that solar collector 32 is attached at the top by a horizontal hinge 34, allowing it to swing up and away from the side of the trailer. This permits the position of the collector 32 to be manually adjusted so that it can be aimed more directly at the sun and thus absorb more light. The solar collector 32 is eight feet high, sixteen feet long, and seven inches deep. Several inches of depth (nearest the trailer body) are occupied by insulation. The collector has a transparent face 36 of low-iron, non-reflective, tempered glass which admits light and yet retains heat. Beneath the glass 36 is a corrugated aluminum collector plate 38 painted to absorb the admitted light and convert it to heat which is then transferred to the air surrounding the collector plate 38. Air flows both in front of and behind plate 38 after entering the collector through screened, circular openings 40, which are open to the atmosphere. Here dry, cool air for dehydration first enters the system. As the air is drawn through the collector 32 by a blower (to be described below), its temperature rises due to absorption of heat from the collector plate 38. At the rear end of collector 32, the preheated air enters a vertical duct 33 leading to a flexible coupling 45, behind the collector near its upper rear corner, which directs the preheated air to the dehydrator's heat exchanger 42, located in the upper portion of the trailer immediately behind the collector. Flexible coupling 45 is necessary to maintain the integrity of the air channel while allowing for the swinging movement of the hinged collector 32.

HEAT EXCHANGER

Figure 10:
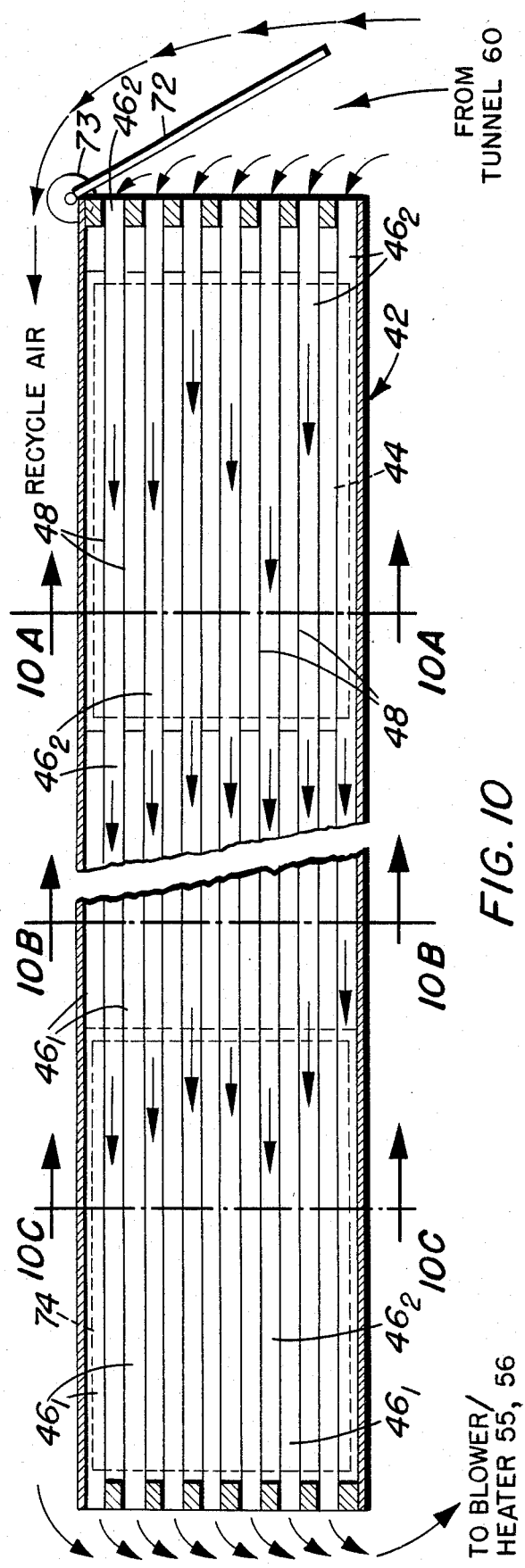
FIG. 10 is a vertical, longitudinal sectional view of the heat exchanger.
Figure 10B:
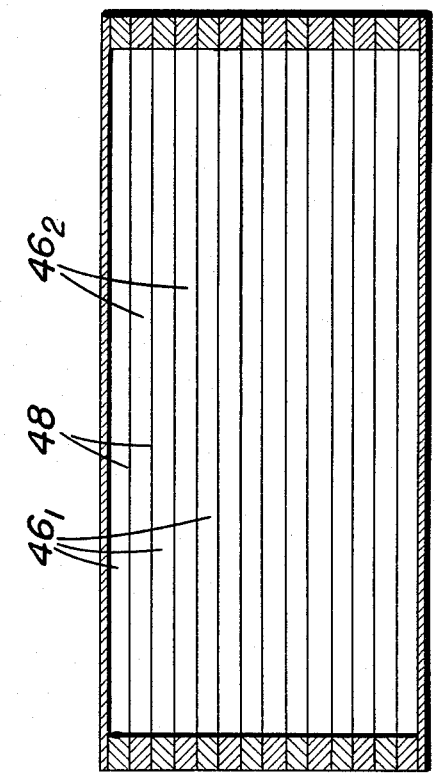
FIGS. 10A, B, C are sectional views taken along line 10A—10A, 10B—10B and 10C—10C, respectively, of FIG. 10.
Figure 10A:
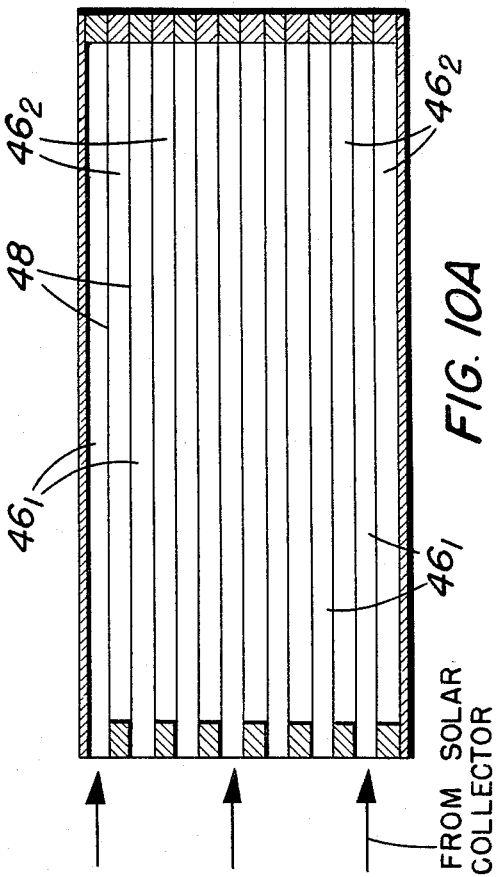

Air leaving the collector enters the heat exchanger 42, shown most clearly in FIGS. 6 and 10, through its inlet port 44. Heat exchanger 42 extends almost the entire length of the trailer, at the top of the right-hand side of the trailer, above the food carts, and consists of a number of intake channels $46_1$ interleaved with exhaust channels $46_2$. All of the channels 46 are separated from each other by thin polyester membranes 48, such as Mylar. Air from inlet port 44 enters only the intake channels $46_1$, travelling forward through the heat exchanger and absorbing energy, through the Mylar membranes 48, from the air in exhaust channels $46_2$. Absorption of energy in this way further preheats the inlet air stream.

The exhaust air which is being returned to the atmosphere also travels forward within the heat exchanger, through exhaust channels $46_2$, which are open at the rear to receive air from the drying tunnel. At the forward end of the heat exchanger, after the exhaust air stream has given up its energy to the inlet air stream through Mylar membranes 48, the exhaust air stream leaves the dehydrator through exhaust port 74 and returns to the atmosphere.

BLOWER AND HEATER

The forward ends of the heat exchanger's seven intake channels $46_1$ are open, and as the inlet air stream leaves the heat exchanger 42 it meets fixed deflector 50 which causes it to move downward into the heater/blower chamber 52. Here it mixes with any air being recirculated through recirculation duct 54 and enters the blower 55, comprising a fan driven by an electric motor. Leaving the blower 55, the inlet air stream passes next to the heater 56, a one-million-BTU propane-fueled combustion heater, which heats the inlet air stream by means of a star burner (not shown) designed to disperse the flame over a wide area.

TUNNEL

Downstream from heater 56 is an intake plenum 58, a chamber shaped and baffled so as to evenly distribute the air flow from the heater over the entire cross section of the tunnel 60. Just past intake plenum 58 is a thermostat 62, which controls heater 56 to maintain the desired air temperature in the tunnel.

Figure 5:
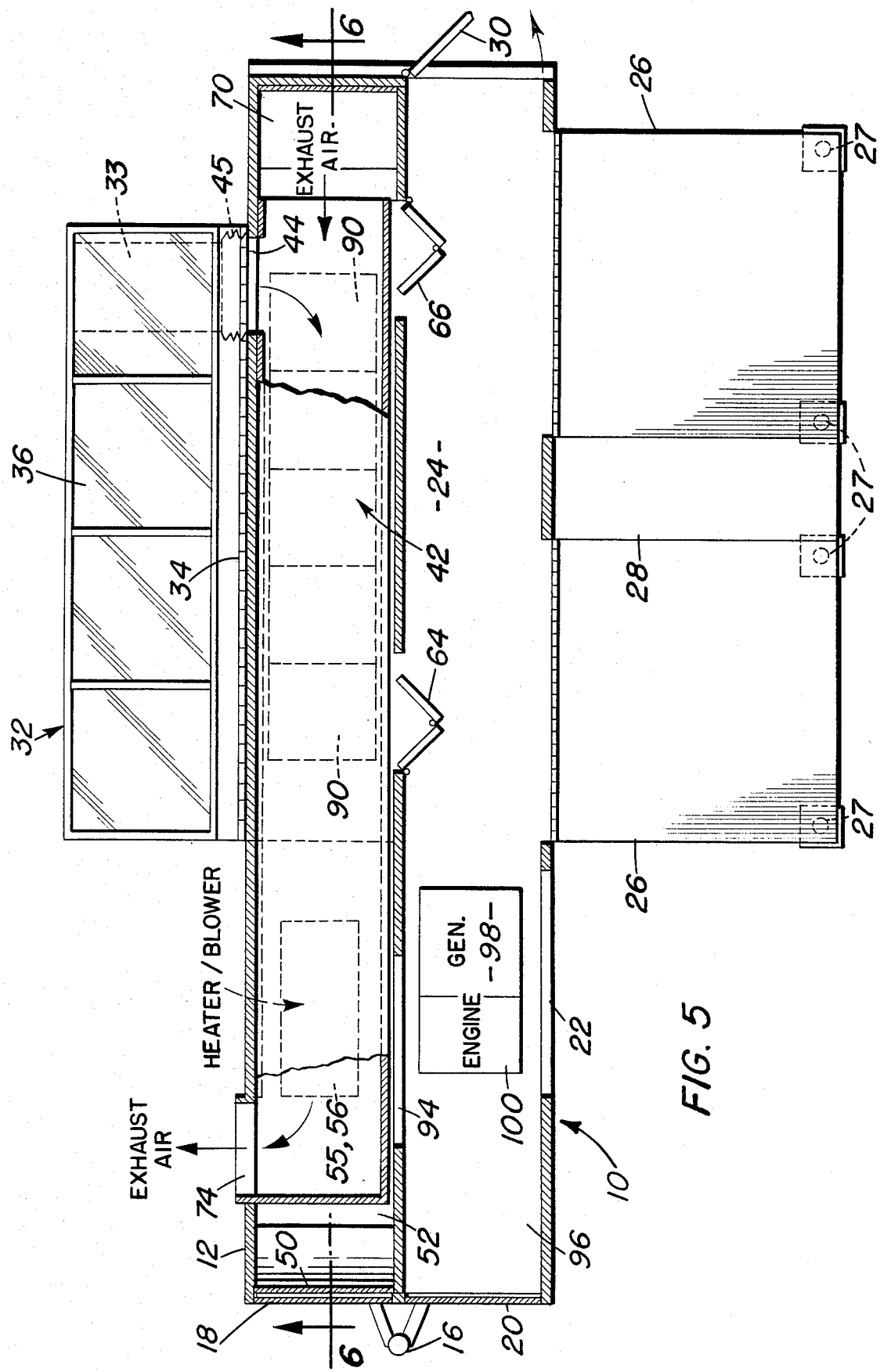
FIG. 5 is a top plan view, partially in section, of the trailer.

The tunnel 60, where the food is placed for drying, is twenty feet long and open at both ends, allowing hot air to be blown through it and over the food, which rests on trays stacked in several carts 90. Access to the tunnel for inserting and removing the carts is provided by two doors 64 and 66 (see FIGS. 2 and 5). The exhaust air stream leaving the tunnel passes a humidistat 68 and enters the exhaust plenum 70, which deflects it upward to the distribution damper 72.

DISTRIBUTION DAMPER

The distribution damper is a movable vane operated by a rotary electric motor 73. Distribution damper 72 separates from the exhaust air stream a variable portion of the exhaust air to be recirculated through the tunnel, in order to conserve energy. The exhaust air stream leaving the tunnel will still contain a good deal of heat; therefore, any portion of it which can be recirculated will result in less energy having to be supplied to the inlet air stream by heater 56. The portion of air which is recirculated is determined by humidistat 68, which controls the rotary motor 73 operating distribution damper 72 to position the damper so as to divert the proper portion of the exhaust air stream into recirculation duct 54 above the heat exchanger 42. The variable portion of exhaust air diverted into recirculation duct 54 by distribution damper 72 passes directly to the heater/blower chamber 52, where it mixes with and becomes part of the inlet air stream entering blower 55. The remainder of the exhaust air stream, that part not recirculated by distribution damper 72, enters the exhaust channels 46₂ of heat exchanger 42 and is discharged to the atmosphere through louvred opening 74.

AIR FLOW

Figure 11:
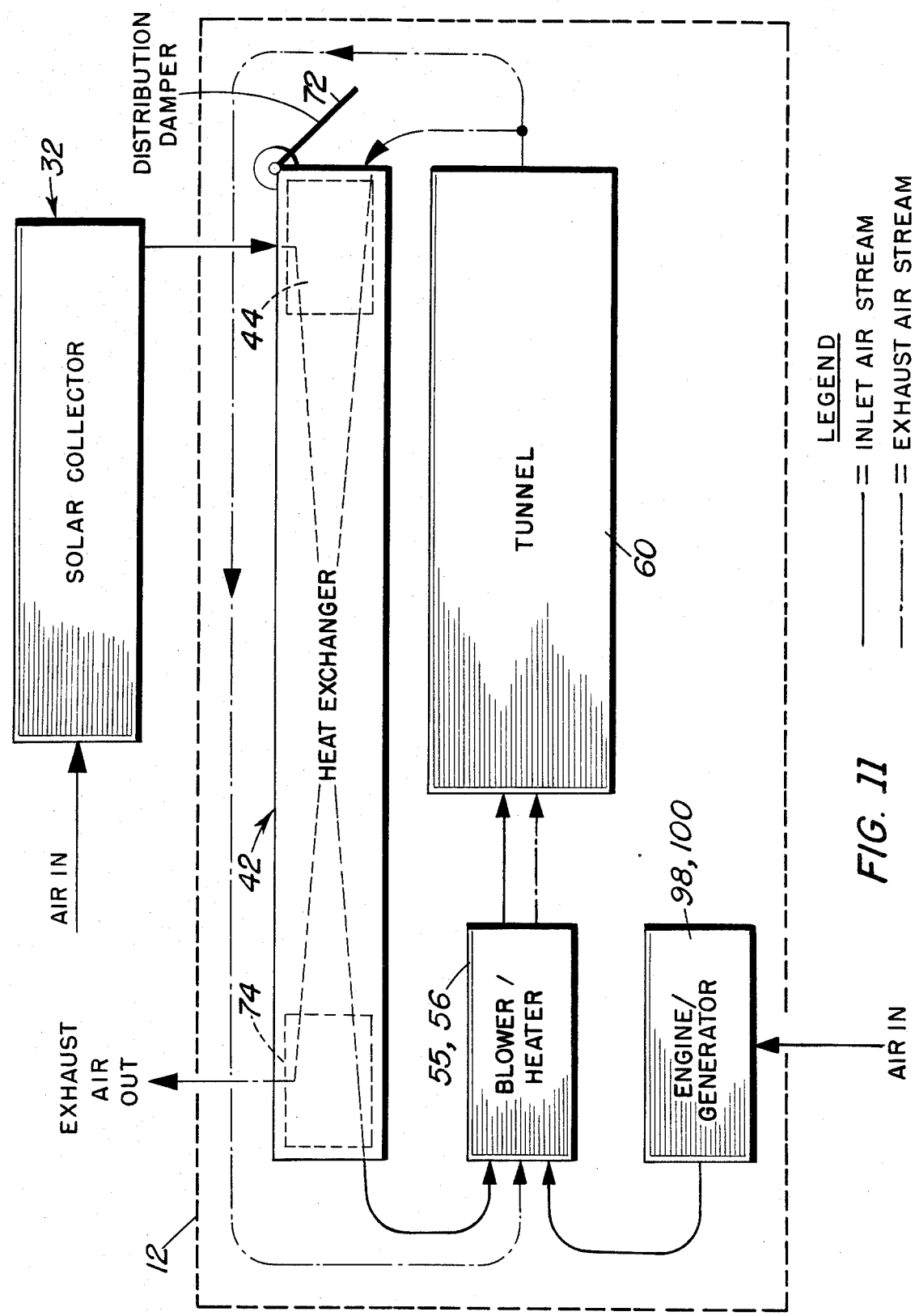
FIG. 11 is a flow diagram of the air flow in the trailer.

FIG. 11 schematically illustrates the drying air system of the present invention. From the atmosphere, the inlet air stream first enters solar collector 32, where it is preheated by energy obtained from sunlight. Next, the inlet air stream passes through heat exchanger 42, which further preheats the air, using energy from the exhaust air stream. The inlet air stream is then accelerated by blower 55 and further heated by heater 56 and enters tunnel 60 to perform its function of dehydration.

The air stream leaving the tunnel, now denominated the exhaust air stream, travels to the distribution damper 72, which divides it into two parts: a variable portion to be recirculated, and the remainder which goes to the heat exchanger. Recirculated air returns to the blower and heater, while the remainder of the exhaust air stream passes through the heat exchanger 42 and out into the atmosphere.

OPERATION

Figure 12:
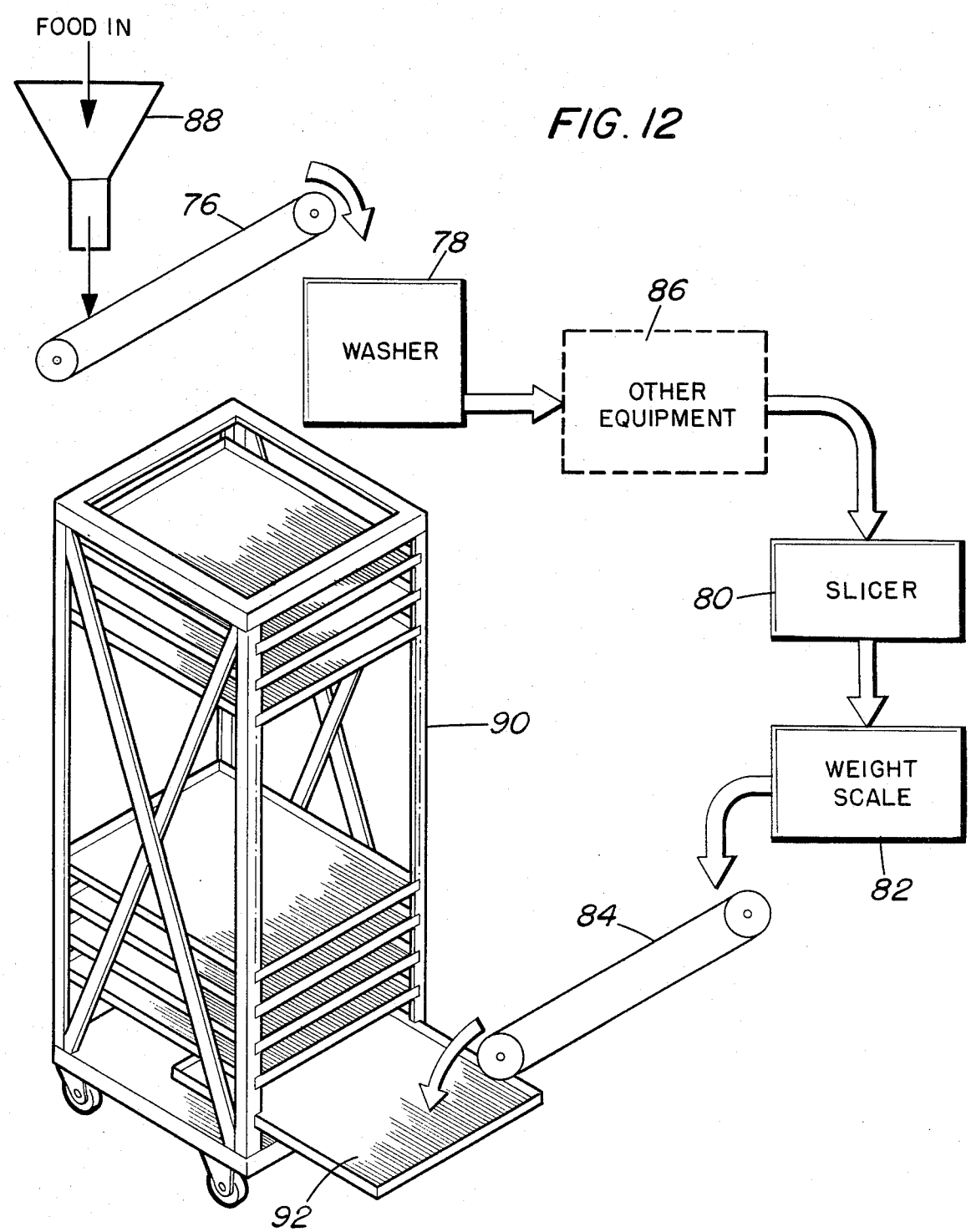
FIG. 12 is a diagram of the process for preparing foods for dehydration.

Operation of the dehydrator is designed to be as simple and automated as possible. After the plant arrives in the field, the food processing equipment is unpacked from the storage areas of the trailer and assembled. Electricity for the operation of the process line, as well as to control and operate the dehydrator proper, comes from the 15 kW, water-cooled generator 98, which is located in the left forward section of the trailer. This apparatus is powered by a collocated propane-fueled internal combustion engine 100. (Fuel for both engine 100 and heater 56 is stored in two 250-gallon tanks 102 beneath the generator and heater compartments). The process line may include various pieces of equipment, depending upon the nature of the good being dehydrated, as shown in FIG. 12. In addition to the normal items—lifting conveyor 76, washer 78, slicer 80, scale 82, and articulating conveyor 84—there may also be a trim table, a pitter, a peeler, or other necessary processing equipment (represented in general by 86).

Food is dumped into a hopper 88 and lifted to the work platform (formed by doors 26 and center board 28) by the lifting conveyor 76. It is then processed as required by the circumstances and loaded, in continuous fashion, on scale 82. When the amount of sliced food on the scale reaches a preselected weight (the quantity of food appropriate for loading onto one tray), the scale automatically dumps the food onto an articulating conveyor 84, which carries it to the cart 90 which is being loaded. The conveyor operator slides the next tray 92 out of the cart, dumps the contents of the conveyor 84 onto the tray, and slides the tray back into the cart. He or she then moves the conveyor down one step, to the location of the next tray, in preparation for loading another tray.

The 31 trays in each cart may be loaded in this manner in 35 minutes. Each fully-loaded cart weighs 200 lbs. and is easily moved by one person on its polypropylene casters. After a cart is fully loaded with food to be dehydrated, it is wheeled into the tunnel 60 through rear door 66. An electric ram 200 in the exhaust plenum area is operated to push all of the carts forward in the tunnel, and the next cart, if it is empty, is removed through forward door 64. The tunnel is closed and the dehydrator turned on at this time, to begin drying the food in the first cart. Experimentally-derived drying times are used to determine when the food in the first cart will be sufficiently dry, and a timer is set to provide a signal (or to shut down the dehydrator) at that time. The rest of the carts are then individually loaded with food and placed in the tunnel, with the dehydrator being shut down for a short time whenever door 64 or 66 is opened. Actual drying times vary from three hours to six hours depending upon the density of the food and the desired moisture content.

When the timer times out, the food in the forwardmost cart (the first one loaded) is dried to the desired moisture content; and the cart may be removed from the tunnel to be emptied into bulk containers, re-loaded, are replaced in the rear end of the tunnel. The timer is then reset for 35 minutes (the length of time which was required to load the second cart), and the dehydrator turned on to complete the drying of the next batch.

The timer mentioned above, which either alerts the operator that drying is complete or shuts down the dehydrator at the completion of drying, is located on a control panel (not shown) at the forward end of the storage/work area 24. The control panel also provides temperature data for various points within the dehydrator (discussed below) and contains all generator and heater controls as well as the circuit breakers and automatic safety switches for the mechanical systems. Illustrated instructions are posted for ease of operation.

Figure 9:
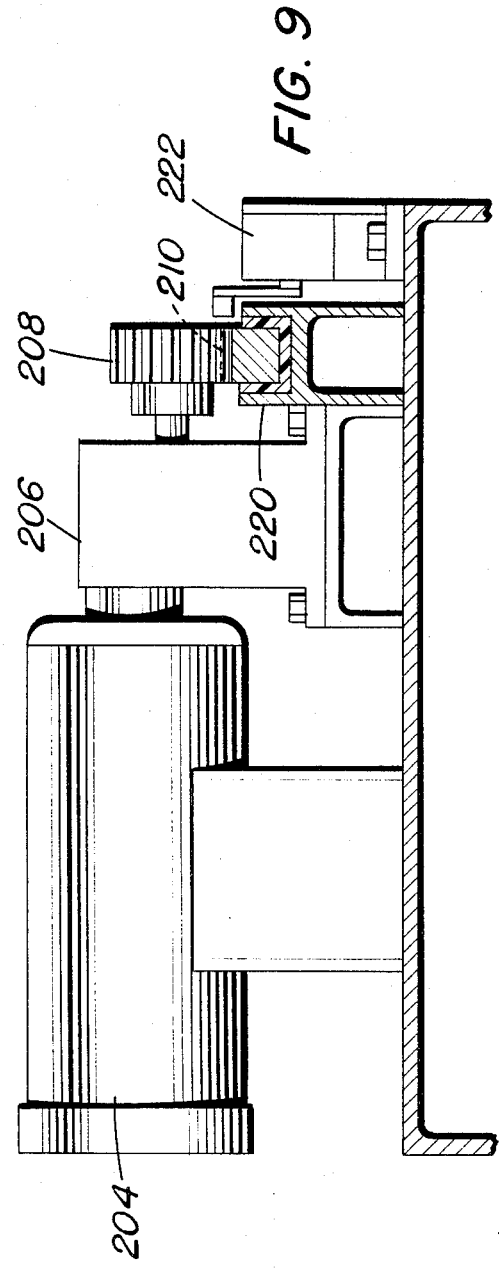
FIG. 9 is a sectional view taken along line 9—9 of FIG. 7.
Figure 3:
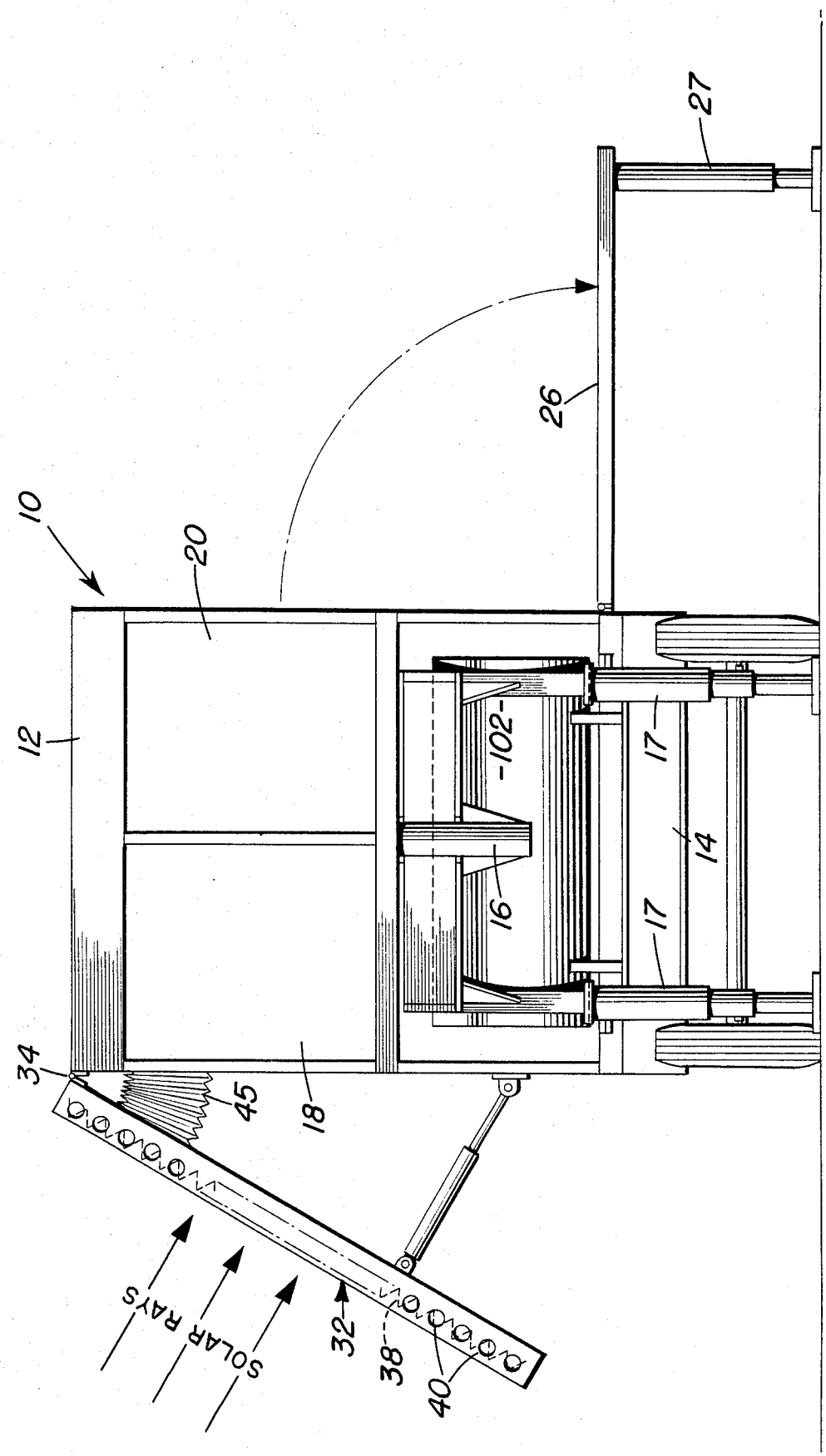
FIG. 3 is a front elevational view of the trailer.
Figure 4:
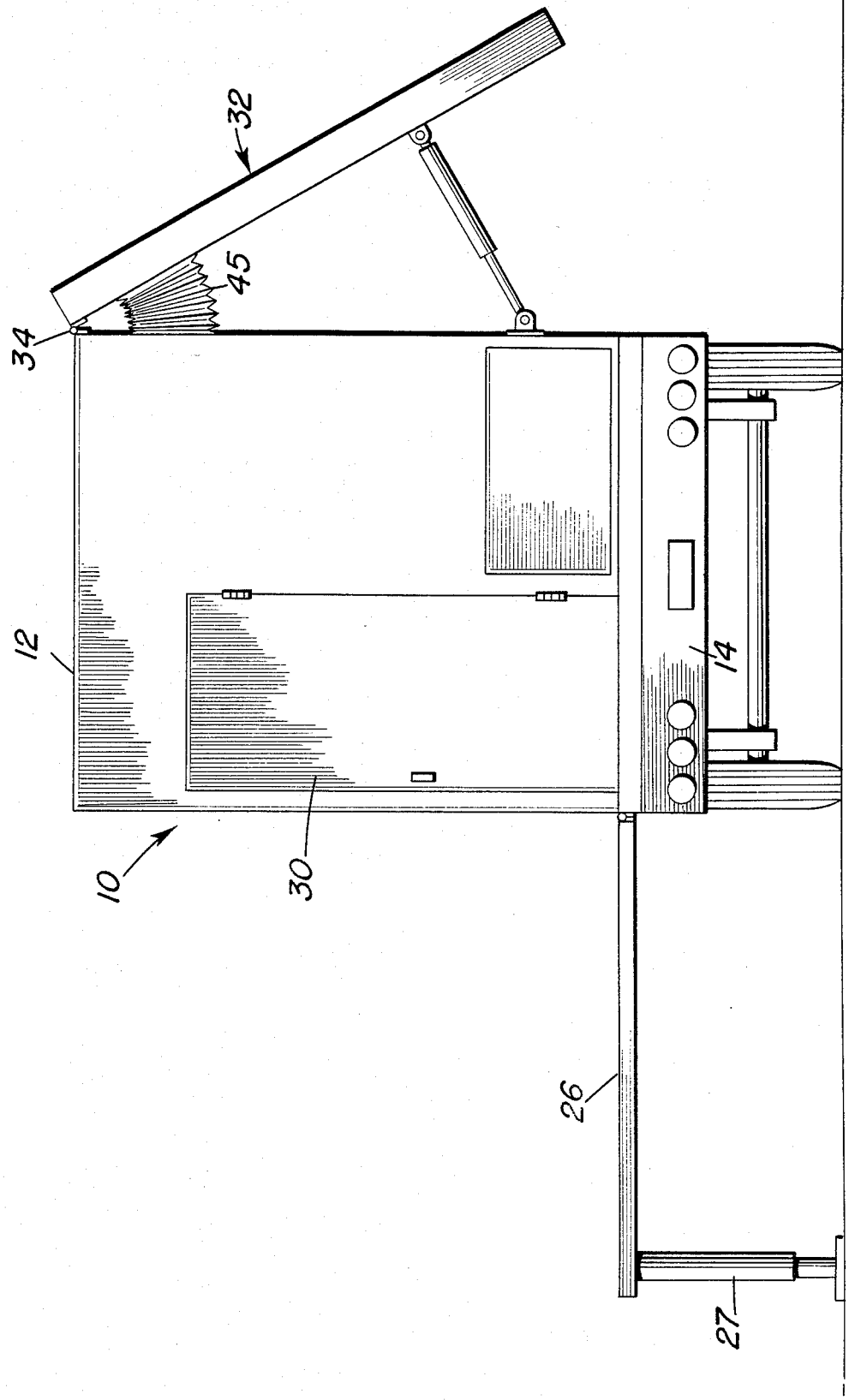
FIG. 4 is a rear elevational view of the trailer.
Figure 7:
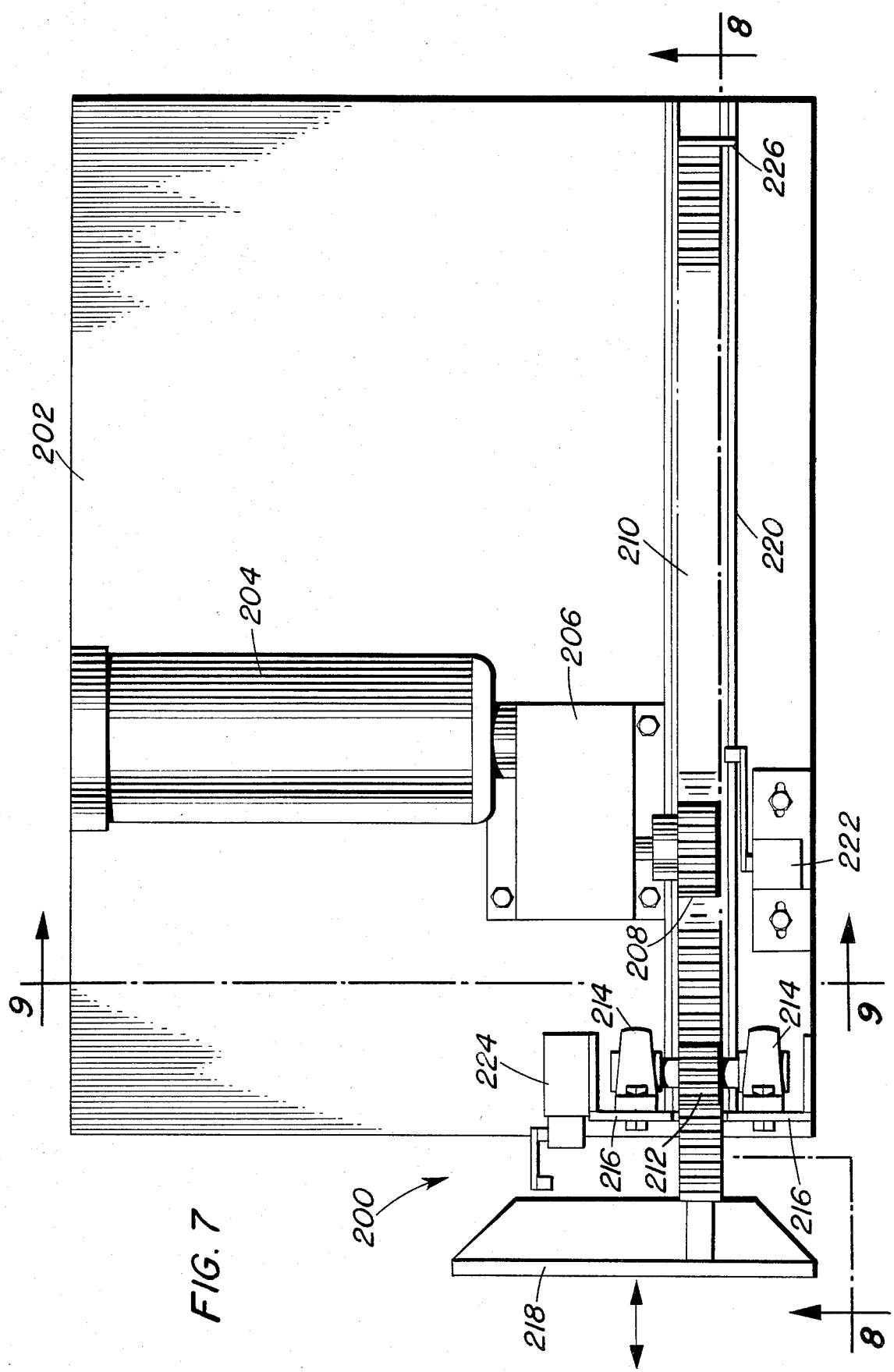
FIG. 7 is a top plan view of the ram for moving the food carts in the drying tunnel.

Because several 200-lb. carts full of food may have to be pushed forward in the tunnel at once, an electric ram 200 is provided in the exhaust plenum area. The ram is illustrated in detail in FIGS. 7-9. All elements are mounted on a base plate 202. Electric motor 204 supplies power, through reduction gearing 206, to pinion gear 208. This pinion gear 208 meshes with a rack gear 210 which forms part of the actuating arm of the ram. Also meshing with rack gear 210 is an idler gear 212 supported on base plate 202 by two pillow block bearings 214 attached to angle brackets 216. At the forward end of the actuating arm is the cart bumper 218 which contacts the carts and pushes them toward the front of the drying tunnel. The ram's actuating arm rests in a channel 220 lined with UHMW plastic, enabling the arm to slide freely without the need for lubrication.

Operation of the ram 200 is accomplished with only three pushbutton switches: forward, reverse, and stop, the last being necessary only in an emergency. Under normal circumstances, the ram is stopped by one of three limit switches, the forward limit switch 222, the reverse limit switch 224, and a switch (not shown) at the forward end of the tunnel. Forward switch 222 shuts off electric power to the ram when its actuating arm has travelled forward one cart-length; the switch is operated by a finger 226 attached to the rear end of the arm. Reverse switch 224 shuts off electric power when contacted by cart bumper 218; this occurs when the actuating arm is fully retracted. The switch in the forward end of the tunnel is designed to shut off the ram when contacted by the leading cart in the tunnel. Since the tunnel will be full at that time, the forwardmost cart will contact the limit switch and stop the ram.

An optional feature of the dehydrator is a moisture analyzer, which may be used to more accurately decide when drying has been completed. The analyzer is used to check the moisture content of food before dehydration, providing another variable from which to determine drying time. At the end of the estimated drying time, the food may again be tested for moisture content, and additonal drying performed if necessary.

Temperature information is available on the control panel, as noted above, from twelve separate stations. The preferred embodiment has temperature-measuring probes in the following locations:

a. Ambient air
b. Solar collector 32
c. Heat exchanger inlet port 44
d. Heat exchanger exhaust port 74
e. Blower motor
f. Intake plenum 58 (floor level)
g. Intake plenum 58 (ceiling level)
h. Rear end of tunnel 60
i. Distribution damper 72

In addition, there is provision in the temperature measurement circuitry for three additional temperature probes. The LED readout on the control panel can display any one of the twelve instantaneous temperatures, in degrees Fahrenheit or Celsius, by operating a twelve-position rotary switch. In addition, the high and low temperatures for each location may be displayed.

Normally, air through tunnel 60 is propelled by blower 55 at a speed of ten to fifteen miles/hour. Thermostat 62 is set to maintain air temperature within the tunnel at 160° F., a suitable temperature for drying all types of food, if enzymes in the food are not to be preserved. Since enzymes are destroyed when food reaches 110°–130° F., some adjustment of temperature is necessary if it is important, in a particular drying operation, to retain the enzymes. In such a case, tunnel air temperature is maintained at 160° F. only until the moisture content of the food drops to 20% (again using experimentally-derived drying times), and then tunnel air temperature is reduced in stages to maintain the temperature of the food itself below 110° F. for the remainder of the dehydration. Obviously, dehydration requires more time when enzymes are to be preserved.

Additional energy saving, beyond that attainable through use of the solar collector 32 and heat exchanger 42 and the recirculation of exhaust air, is available by reclaiming the heat produced during the generation of electricity. There are several possible ways to do this. In the preferred embodiment, louvred opening 22 admits outside air to the generator compartment 96, and an adjustable opening 94 is formed in the center wall between generator compartment 96 and heater/blower chamber 52. The reduced pressure in chamber 52, caused by blower 55, draws outside air through louvred opening 22, past the generator 98 and the internal combustion engine 100 which drives it, through opening 94 and into the inlet air stream. As outside air passes the generator and engine, it absorbs heat from them, which heat is added to the inlet air stream, further reducing the amount of energy required to be added to the inlet air stream by heater 56.

Another method for reclaiming this heat is to pass the internal combustion engine's exhaust through an air-to-air heat exchanger (not shown) within the heater/blower chamber 52. The inlet air stream, passing through the air-to-air heat exchanger, would absorb heat from the hot exhaust gases. Heat created by the generator is also available from its water-filled cooling system. The hot water, like the exhaust, could be passed through a heat exchanger in chamber 52 where it, too, would preheat the inlet air stream. Or this hot water could be used to preheat the water of the blancher which cooks the vegetables before dehydration.

Although illustrative embodiments of the present invention have been described in detail with reference to the accompanying drawings, it is to be understood that the invention is not limited to those precise embodiments and that various changes and modifications may be effected therein by one skilled in the art without departing from the scope or spirit of the invention.

We claim:

1. A food dehydration machine comprising:
   an intake chamber to receive an inlet gas stream;
   heating means connected to said intake chamber for heating the inlet gas stream, said heating means comprising heat exchanger means for preheating the inlet gas stream using the energy from an exhaust gas stream, and a heater to heat the inlet gas stream;
   blower means for accelerating the inlet gas stream;
   drying tunnel means connected to said intake chamber for containing food to be dehydrated and for receiving the heated inlet gas stream and allowing the inlet gas stream to contact the food, the gas stream after contacting the food becoming the exhaust gas stream; and
   recirculation means connected to said drying tunnel means and said heat exchanger means for dividing the exhaust gas stream into two separate parts, a variable portion and a remainder, and for returning the variable portion to mix with the inlet gas stream to be reheated and re-accelerated and directing the remainder to said heat exchanger means, said recirculation means including means for adjusting the relative sizes of the variable portion and the remainder in accordance with a parameter of the gas stream.

2. A food dehydration machine as claimed in claim 1 wherein said heating means further further comprises solar collector means for preheating the inlet gas stream using solar energy.

3. A food dehydration machine as claimed in claim 2 further comprising transport means for moving said machine to a desired location.

4. A food dehydration machine as claimed in claim 3 wherein said transport means contains all processing equipment necessary to prepare the food for dehydration.

5. A food dehydration machine as claimed in claim 4 wherein said transport means comprises power supply means for furnishing all power necessary to the operation of said processing equipment and said dehydration machine.

6. A food dehydration machine as claimed in claim 2 wherein the angle of said solar collector means in relation to the solar energy is adjustable.

7. A food dehydration machine as claimed in claim 1 or 2 wherein said recirculation means comprises a distribution damper to divide the exhaust gas stream into the portion returned to the inlet gas stream and the remainder directed to said heat exchanger means, the position of said distribution damper determining the relative sizes of the portion and the remainder.

8. A food dehydration machine as claimed in claim 1 or 2 wherein said heat exchanger means includes intake channels separated from exhaust channels by polyester membranes.

9. A food dehydration machine as claimed in claim 2 or 3 further comprising support means for supporting the food within said drying tunnel means.

10. A food dehydration machine as claimed in claim 1, 2 or 3 wherein said gas is air.

11. A mobile food dehydration machine comprising:
an intake chamber to receive an inlet air stream;
heating means connected to said intake chamber for preheating the inlet air stream using the energy from an exhaust air stream;
a combustion heater to receive the inlet air stream from said heat exchanger means and to heat the inlet air stream;
a fan to accelerate the inlet air stream;
drying tunnel means for containing food to be dehydrated and for receiving the heated inlet air stream from said combustion heater and allowing the inlet air stream to contact the food, the air stream after contacting the food becoming the exhaust air stream;
a distribution damper adjacent said drying tunnel means to divide the exhaust air stream into two separate parts, a variable portion and a remainder, and to divert the variable portion and direct the remainder to said heat exchanger means, the position of said distribution damper determining the relative sizes of the portion and the remainder, wherein the position of said distribution damper is determined by a parameter of the gas stream; and
a recirculation duct positioned to return the diverted portion of the exhaust air stream to mix with the inlet air stream to be reheated and re-accelerated.

12. A food dehydration machine as claimed in claim 11 further comprising solar collector means between said intake port and said heat exchanger means for preheating the inlet air stream using solar energy.

13. A food dehydration machine as claimed in claim 12 wherein the angle of said solar collector means in relation to the solar energy is adjustable.

14. A food dehydration machine comprising:
an intake chamber to receive an inlet gas stream;
heating means connected to said intake chamber for heating the inlet gas stream, said heating means comprising heat exchanger means for preheating the inlet gas stream using the energy from an exhaust gas stream, and solar collector means for preheating the inlet gas stream using solar energy;
blower means for accelerating the inlet gas stream;
drying tunnel means connected to said intake chamber for containing food to be dehydrated and for receiving the heated inlet gas stream and allowing the inlet gas stream to contact the food, the gas stream after contacting the food becoming the exhaust gas stream; and
recirculation means connected to said drying tunnel means and said heat exchanger means for dividing the exhaust gas stream into two separate parts, a variable portion and a remainder, and for returning the variable portion to mix with the inlet gas stream to be re-accelerated and directing the remainder to said head exchanger means, said recirculation means including means for adjusting the relative sizes of the variable portion and the remainder in accordance with a parameter of the gas stream.

15. A mobile food dehydration machine comprising:
an intake chamber to receive an inlet air stream;
heat exchanger means connected to said intake chamber for preheating the inlet air stream using the energy from an exhaust air stream;
solar collector means connected to said heat exchanger means for preheating the inlet air stream using solar energy;
a fan to accelerate the inlet air stream;
drying tunnel means for containing food to be dehydrated and for receiving the heated inlet air stream and allowing the inlet air stream to contact the food, the air stream after contacting the food becoming the exhaust air stream;
a distribution damper adjacent said drying tunnel means to divide the exhaust air stream into two separate parts, a variable portion and a remainder, and to divert the variable portion and direct the remainder to said heat exchanger means, the position of said distribution damper determining the relative sizes of the portion and the remainder, wherein the position of said distribution damper is determined by a parameter of the gas stream; and
a recirculation duct positioned to return the diverted portion of the exhaust air stream to mix with the inlet air stream to be re-accelerated.

16. In a food dehydration machine comprising drying tunnel means for receiving an inlet gas stream, containing food to be dehydrated, and allowing the inlet gas stream to contact the food, the gas stream upon being discharged from the drying tunnel means becoming the exhaust gas stream, a method of dehydrating the food comprising the steps of:
accelerating the inlet gas stream through the drying tunnel means;
dividing the exhaust gas stream into two separate parts, a variable portion and a remainder;
returning the variable portion to the inlet gas stream to be re-accelerated;
recovering heat from the remainder;
imparting at least a portion of the recovered heat to the inlet gas stream; and
adjusting the relative sizes of the variable portion and the remainder in accordance with a parameter of the gas stream.

17. The method of claim 16 further comprising the step of heating the inlet gas stream.

18. The method of claim 17 wherein said step of heating the inlet gas stream comprises the steps of:
collecting solar energy;
converting the collected solar energy to heat; and
imparting at least a portion of the heat converted from solar energy in the inlet gas stream.

19. The method of claim 17 wherein said step of heating the inlet gas stream comprises the steps of:
oxidizing a fuel to create heat; and
imparting at least a portion of the heat created by oxidizing fuel to the inlet gas stream.

20. The method of claim 17 wherein said step of heating the inlet gas stream comprises heating the inlet gas stream to a temperature substantially no greater than 160° F.

21. The method of claim 18 wherein said step of heating the inlet gas stream further comprises heating the inlet gas stream over a variable and programmable range.

22. The method of claim 17 wherein said step of heating the inlet gas stream comprises heating the inlet gas stream while maintaining the temperature of the food substantially between 100° F. and 150° F.

23. The method of claim 22 wherein said step of heating the inlet gas stream further comprises maintaining the temperature of the food within prescribed variable and programmable temperature limits.

24. The method of claim 16 wherein said step of accelerating the inlet gas stream comprises accelerating the inlet gas stream to a velocity substantially within the range of 2 to 20 miles/hour.

25. The method of claim 24 wherein said step of accelerating the inlet gas stream further comprises accelerating the inlet gas stream to a variable and programmable velocity.

26. A food dehydration machine comprising:
an intake chamber to receive an inlet gas stream;
heating means connected to said intake chamber for heating the inlet gas stream, said heating means comprising heat exchanger means for preheating the inlet gas stream using the energy from an exhaust gas stream, and a heater to heat the inlet gas stream;
blower means for accelerating the inlet gas stream;
drying tunnel means connected to said intake chamber for containing food to be dehydrated and for receiving the heated inlet gas stream and allowing the inlet gas stream to contact the food, the gas stream after contacting the food becoming the exhaust gas stream; and
recirculation means connected to said drying tunnel means and said heat exchanger means for dividing the exhaust gas stream into two separate parts, a variable portion and a remainder, and for returning the variable portion to mix with the inlet gas stream to be reheated and re-accelerated and directing the remainder to said heat exchanger means, said recirculation means comprising a distribution damper to divide the exhaust stream into the portion returned to the inlet gas stream and the remainder directed to said heat exchanger means, the position of said distribution damper determining the relative sizes of the portion and the remainder, wherein the position of said distribution damper is determined by the humidity of the exhaust gas stream.

27. A food dehydration machine as claimed in claim 26 wherein said heating means further comprises solar collector means for preheating the inlet gas stream using solar energy.

28. A food dehydration machine comprising:
an intake chamber to receive an inlet gas stream;
heating means connected to said intake chamber for heating the inlet gas stream, said heating means comprising heat exchanger means for preheating the inlet gas stream using the energy from an exhaust gas stream, solar collector means for preheating the inlet gas stream using solar energy, and a heater to heat the inlet gas stream;
blower means for accelerating the inlet gas stream;
drying tunnel means connected to said intake chamber for containing food to be dehydrated and for receiving the heated inlet gas stream and allowing the inlet gas stream to contact the food, the gas stream after contacting the food becoming the exhaust gas stream;
support means for supporting the food within said drying tunnel means, said support means comprising at least one cart movable within said drying tunnel means;
a ram positioned to move said cart within said drying tunnel means; and
recirculation means connected to said drying tunnel means and said heat exchanger means for dividing the exhaust gas stream into two separate parts, a variable portion and a remainder, and for returning the variable portion to mix with the inlet gas stream to be reheated and re-accelerated and directing the remainder to said heat exchanger means, said recirculation means comprising a distribution damper to divide the exhaust gas stream into the portion returned to the inlet gas stream and the remainder directed to said heat exchanger means, the position of said distribution damper determining the relative sizes of the portion and the remainder, wherein the position of said distribution damper is determined by the humidity of the exhaust gas stream.

29. A food dehydration machine as claimed in claim 28 further comprising transport means for moving said machine to a desired location.

30. A mobile food dehydration machine comprising:
an intake chamber to receive an inlet air stream;
heating means connected to said intake chabmer for preheating the inlet air stream using the energy from an exhaust air stream;
a combustion heater to receive the inlet air stream from said heat exchanger means and to heat the inlet air stream;
a fan to accelerate the inlet air stream;
drying tunnel means for containing food to be dehydrated and for receiving the heated inlet air stream from said combustion heater and allowing the inlet air stream to contact the food, the air stream after contacting the food becoming the exhaust air stream;
a distribution damper adjacent said drying tunnel means to divide the exhaust air stream into two separate parts, a variable portion and a remainder, and to divert the variable portion and direct the remainder to said heat exchanger means, the position of said distribution damper determining the relative sizes of the portion and the remainder, wherein the position of said distribution damper is determined by the humidity of the exhaust air stream; and
a recirculation duct positioned to return the diverted portion of the exhaust air stream to mix with the inlet air stream to be reheated and reaccelerated.

31. A food dehydration machine as claimed in claim 30 further comprising:
a humidistat to supply a signal representative of the humidity of the exhaust air stream; and
a motor responsive to the signal to automatically position said distribution damper.

32. A mobile food dehydration machine comprising:
an intake chamber to receive an inlet air stream;
heating means connected to said intake chamber for preheating the inlet air stream using the energy from an exhaust air stream;
a combustion heater to receive the inlet air stream from said heat exchanger means and to heat the inlet air stream;
a fan to accelerate the inlet air stream;
drying tunnel means for containing food to be dehydrated and for receiving the heated inlet air stream from said combustion heater and allowing the inlet air stream to contact the food, the air stream after contacting the food becoming the exhaust air stream;

a distribution damper adjacent said drying tunnel means to divide the exhaust air stream into two separate parts, a variable portion and a remainder, and to divert the variable portion and direct the remainder to said heat exchanger means, the position of said distribution damper determining the relative sizes of the portion and the remainder; and a recirculation duct positioned to return the diverted portion of the exhaust air stream to mix with the inlet air stream to be reheated and reaccelerated;

an electric motor to drive said fan;

a generator to supply electrical power to said motor;

an internal combustion engine to drive said generator; and fuel supply means for supplying fuel to said internal combustion engine and said combustion heater.

33. A food dehydration machine as claimed in claim 32 further comprising solar collector means between said intake chamber and said heat exchanger means for preheating the inlet air stream using solar energy.

34. In a food dehydration machine comprising drying tunnel means for receiving an inlet gas stream, containing food to be dehydrated, and allowing the inlet gas stream to contact the food, the gas stream upon being discharged from the drying tunnel means becoming an exhaust gas stream, a method of dehydrating the food comprising the steps of:

accelerating the inlet gas stream through the drying tunnel means;

determining the humidity of the exhaust gas stream;

dividing the exhaust gas stream into two separate parts, a variable portion and a remainder, the variable portion being variable in accordance with the determined humidity;

returning the variable portion to the inlet gas stream to be reaccelerated;

recovering heat from the remainder; and imparting at least a portion of the recovered heat to the inlet gas stream.

* * * * *